US011322140B2

(12) United States Patent
Aggarwal et al.

(10) Patent No.: US 11,322,140 B2
(45) Date of Patent: *May 3, 2022

(54) PROVIDING PROMPT IN AN AUTOMATED DIALOG SESSION BASED ON SELECTED CONTENT OF PRIOR AUTOMATED DIALOG SESSION

(71) Applicant: Google LLC, Mountain View, CA (US)

(72) Inventors: Vikram Aggarwal, Palo Alto, CA (US); Yew Jin Lim, Saratoga, CA (US); Adam Goldstein, San Mateo, CA (US)

(73) Assignee: GOOGLE LLC, Mountain View, CA (US)

( * ) Notice: Subject to any disclaimer, the term of this patent is extended or adjusted under 35 U.S.C. 154(b) by 166 days.

This patent is subject to a terminal disclaimer.

(21) Appl. No.: 16/530,660

(22) Filed: Aug. 2, 2019

(65) Prior Publication Data

US 2019/0355361 A1   Nov. 21, 2019

Related U.S. Application Data

(63) Continuation of application No. 15/357,733, filed on Nov. 21, 2016, now Pat. No. 10,446,144.

(51) Int. Cl.
*G10L 15/22* (2006.01)
*G06F 40/35* (2020.01)
(Continued)

(52) U.S. Cl.
CPC ............. *G10L 15/22* (2013.01); *G06F 40/35* (2020.01); *G06F 40/56* (2020.01); *G10L 15/30* (2013.01); *G10L 2015/225* (2013.01)

(58) Field of Classification Search
None
See application file for complete search history.

(56) References Cited

U.S. PATENT DOCUMENTS 7,962,430 B1   6/2011 Heidenreich et al.
9,563,641 B1 * 2/2017 Tomkins ........... G06F 16/24578
(Continued)

FOREIGN PATENT DOCUMENTS

CN    105224586    1/2016
CN    105247511    1/2016

OTHER PUBLICATIONS

Japanese Patent Office; Notice of Reasons for Rejection issue in Application No. JP2019527252; 4 pages, dated Sep. 28, 2020.
(Continued)

*Primary Examiner* — Jonathan C Kim
(74) *Attorney, Agent, or Firm* — Middleton Reutlinger

(57) ABSTRACT

Methods, apparatus, and computer readable media related to soliciting feedback from a user regarding one or more content parameters of a suggestion or other content provided by the automated assistant. The user's feedback may be used to influence future suggestions and/or other content subsequently provided, by the automated assistant in future dialog sessions, to the user and/or to other users. In some implementations, content is provided to a user by an automated assistant in a dialog session between the user and the automated assistant—and the automated assistant provides a prompt that solicits user feedback related to the provided content in a future dialog session between the user and the automated assistant. In some of those implementations, the prompt is provided following input from the user and/or output from the automated assistant, in the future dialog session, that is unrelated to the content provided in the previous dialog session.

18 Claims, 10 Drawing Sheets

(51) Int. Cl.
*G06F 40/56* (2020.01)
*G10L 15/30* (2013.01)

(56) References Cited

U.S. PATENT DOCUMENTS

| | | | | |
|---|---|---|---|---|
| 9,633,317 | B2* | 4/2017 | Gabel | G06N 5/022 |
| 2003/0217160 | A1* | 11/2003 | Gayama | G06F 16/40 |
| | | | | 709/228 |
| 2006/0015480 | A1* | 1/2006 | Conahan | A61P 9/10 |
| 2006/0020614 | A1* | 1/2006 | Kolawa | G06Q 30/02 |
| 2008/0282204 | A1* | 11/2008 | Del Valle Lopez | G06F 9/453 |
| | | | | 715/866 |
| 2009/0248510 | A1 | 10/2009 | Ahluwalia | |
| 2010/0036670 | A1* | 2/2010 | Hill | H04W 4/029 |
| | | | | 705/304 |
| 2010/0049517 | A1* | 2/2010 | Huang | H04M 3/4936 |
| | | | | 704/251 |
| 2010/0185510 | A1* | 7/2010 | Maier | G06Q 30/02 |
| | | | | 705/14.49 |
| 2010/0185552 | A1* | 7/2010 | DeLuca | G06Q 30/02 |
| | | | | 705/347 |
| 2010/0262282 | A1* | 10/2010 | Segal | G07F 9/002 |
| | | | | 700/241 |
| 2011/0276513 | A1* | 11/2011 | Erhart | G06F 16/2465 |
| | | | | 705/347 |
| 2012/0078667 | A1* | 3/2012 | Denker | G06Q 30/0643 |
| | | | | 705/5 |
| 2012/0246004 | A1* | 9/2012 | Book | G06Q 30/02 |
| | | | | 705/14.58 |
| 2012/0284129 | A1* | 11/2012 | Martucci | G06Q 50/12 |
| | | | | 705/15 |
| 2012/0303561 | A1* | 11/2012 | Sathish | G06N 20/00 |
| | | | | 706/14 |
| 2012/0323577 | A1* | 12/2012 | Correia | G10L 15/22 |
| | | | | 704/254 |
| 2013/0055354 | A1* | 2/2013 | Weinberg | G06Q 30/0631 |
| | | | | 726/4 |
| 2013/0110518 | A1* | 5/2013 | Gruber | H04M 1/6091 |
| | | | | 704/275 |
| 2013/0268260 | A1* | 10/2013 | Lundberg | G06F 40/40 |
| | | | | 704/8 |
| 2013/0275164 | A1* | 10/2013 | Gruber | G10L 17/22 |
| | | | | 705/5 |
| 2013/0283168 | A1* | 10/2013 | Brown | G06F 3/04842 |
| | | | | 715/728 |
| 2013/0332839 | A1* | 12/2013 | Frazier | H04N 21/4668 |
| | | | | 715/738 |
| 2013/0346016 | A1* | 12/2013 | Suzuki | G06F 16/9537 |
| | | | | 702/141 |
| 2014/0114705 | A1 | 4/2014 | Bashvitz et al. | |
| 2014/0129335 | A1* | 5/2014 | Huffman | G06Q 30/0257 |
| | | | | 705/14.58 |
| 2014/0143157 | A1* | 5/2014 | Jeffs | H04M 3/5175 |
| | | | | 705/304 |
| 2014/0156645 | A1* | 6/2014 | Brust | H04L 67/22 |
| | | | | 707/722 |
| 2014/0156646 | A1* | 6/2014 | Brust | G06F 16/24 |
| | | | | 707/722 |
| 2014/0164953 | A1* | 6/2014 | Lynch | H04L 51/046 |
| | | | | 715/753 |
| 2014/0278413 | A1* | 9/2014 | Pitschel | G10L 15/22 |
| | | | | 704/243 |
| 2014/0278444 | A1* | 9/2014 | Larson | G10L 15/22 |
| | | | | 704/275 |
| 2014/0282003 | A1* | 9/2014 | Gruber | G06F 3/167 |
| | | | | 715/727 |
| 2014/0282974 | A1* | 9/2014 | Maher | H04L 9/3271 |
| | | | | 726/7 |
| 2014/0310002 | A1* | 10/2014 | Nitz | G10L 15/22 |
| | | | | 704/270.1 |
| 2014/0324624 | A1* | 10/2014 | Ward | H04W 4/21 |
| | | | | 705/26.7 |
| 2014/0344718 | A1 | 11/2014 | Rapaport et al. | |
| 2014/0365885 | A1 | 12/2014 | Carson et al. | |
| 2015/0012426 | A1* | 1/2015 | Purves | G06Q 20/321 |
| | | | | 705/41 |
| 2015/0066479 | A1* | 3/2015 | Pasupalak | G06F 40/40 |
| | | | | 704/9 |
| 2015/0095104 | A1* | 4/2015 | Goldberg | G06Q 30/0255 |
| | | | | 705/7.29 |
| 2015/0127587 | A1* | 5/2015 | Pinckney | G06Q 30/02 |
| | | | | 706/11 |
| 2015/0178392 | A1* | 6/2015 | Jockisch | G06F 16/9535 |
| | | | | 707/706 |
| 2015/0186156 | A1* | 7/2015 | Brown | G06Q 10/10 |
| | | | | 715/706 |
| 2015/0186958 | A1* | 7/2015 | Jackson | H04W 4/029 |
| | | | | 705/347 |
| 2015/0254214 | A1* | 9/2015 | Rosenberg | G09B 7/08 |
| | | | | 715/202 |
| 2016/0110347 | A1* | 4/2016 | Kennewick, Jr. | G06F 16/3329 |
| | | | | 704/9 |
| 2016/0188565 | A1 | 6/2016 | Robichaud et al. | |
| 2016/0232201 | A1* | 8/2016 | Goran | G06F 3/017 |
| 2016/0260436 | A1 | 9/2016 | Lemay et al. | |
| 2016/0342317 | A1* | 11/2016 | Lim | G10L 15/22 |
| 2016/0342683 | A1* | 11/2016 | Lim | G06F 16/35 |
| 2016/0350304 | A1* | 12/2016 | Aggarwal | G10L 15/26 |
| 2017/0109446 | A1* | 4/2017 | Wu | G06F 7/02 |
| 2017/0192949 | A1* | 7/2017 | Gaither | G06F 40/174 |
| 2017/0228367 | A1* | 8/2017 | Pasupalak | G06F 16/90332 |
| 2017/0255986 | A1* | 9/2017 | Herbst | G06Q 30/0282 |
| 2017/0269972 | A1* | 9/2017 | Hosabettu | G06F 9/4843 |
| 2017/0328725 | A1* | 11/2017 | Schlesinger | G01C 21/3484 |
| 2017/0329766 | A1* | 11/2017 | Matsuyama | G06F 16/00 |
| 2017/0329933 | A1* | 11/2017 | Brust | G06F 16/24575 |
| 2017/0345417 | A1* | 11/2017 | Kennewick, Jr. | G06F 16/3329 |
| 2018/0025395 | A1* | 1/2018 | Schiff | G06Q 30/0282 |
| | | | | 705/26.7 |
| 2018/0040002 | A1* | 2/2018 | Tierney | G06Q 30/0201 |
| 2018/0144743 | A1* | 5/2018 | Aggarwal | G06F 40/56 |
| 2020/0002052 | A1* | 1/2020 | Johnson | B65D 17/02 |

OTHER PUBLICATIONS

China National Intellectual Property Administration; Notification of First Office Action issuesd in Application No. 201710882194.6; 41 pages; dated Apr. 14, 2021.
European Patent Office—International Searching Authority; Notification of Transmittal of the International Search Report and the Written Opinion of PCT Serial No. PCT/US2017/053828; dated Dec. 14, 2017.
United Kingdom Intellectual Property Office; Official Action issued in Application No. GB1715644.9 dated Feb. 26, 2018.
Irish Patent Office; Search Report and Written Opinion issued in Application No. 2017/0204 dated Apr. 12, 2018.
European Patent Office; Written Opinion of the International Preliminary Examining Authority of International Application No. PCT/US2017/053828; 15 pages; dated May 3, 2018.
European Patent Office; International Preliminary Report on Patentability of PCT Ser. No. PCT/US2017/053828; 34 pages; dated Aug. 9, 2018.
Japanese Patent Office; Notice of Allowance issued in Application No. 2019-527252; 3 pages; dated May 24, 2021.
Korean Patent Office; Notice of Office Action issue in Application No. 10-2019-7017350; 8 pages; dated Feb. 19, 2021.
European Patent Office; Communication Pursuant to Article 94(3) EPC issue in Application No. 17784121.0; 13 pages; dated Feb. 11, 2021.
Intellectual Property India; Office Action issue in Application No. 201927024396; 6 pages; dated Mar. 3, 2021.
Korean Patent Office; Notice of Office Action issue in Application No. 10-2019-7017350; 13 pages; dated Aug. 11, 2021.
China National Intellectual Property Administration; Notice of Allowance issued in Application No. 201710882194.6; 6 pages; dated Oct. 11, 2021.
Intellectual Property Office of Singapore; Written Opinion of Application No. 10201708066W; 7 pages dated May 20, 2021.

(56) References Cited

OTHER PUBLICATIONS

Korean Patent Office; Notice of Allowance issue in Application No. 10-2019-7017350; 3 pages; dated Nov. 29, 2021.

* cited by examiner

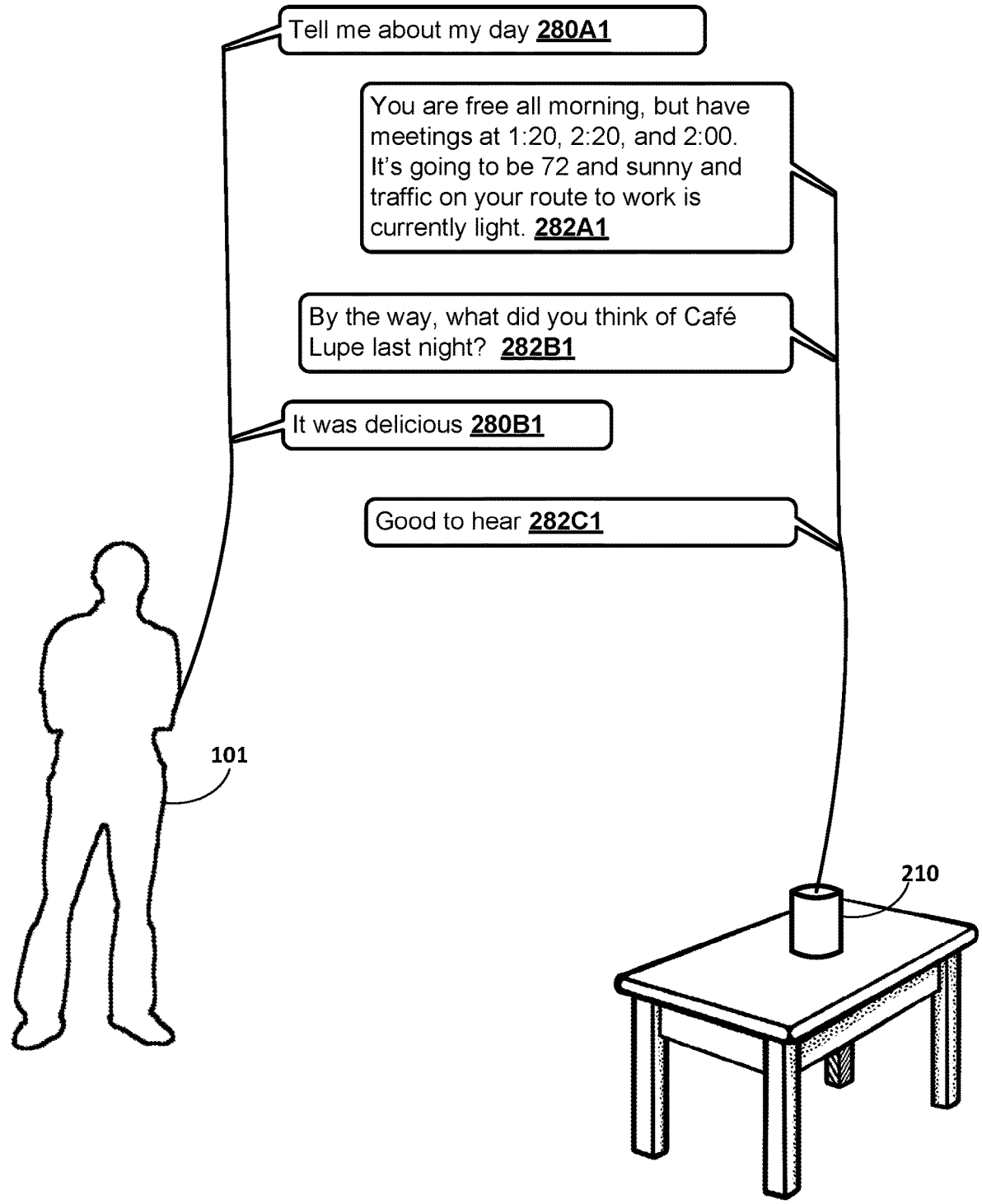
FIG. 2B1

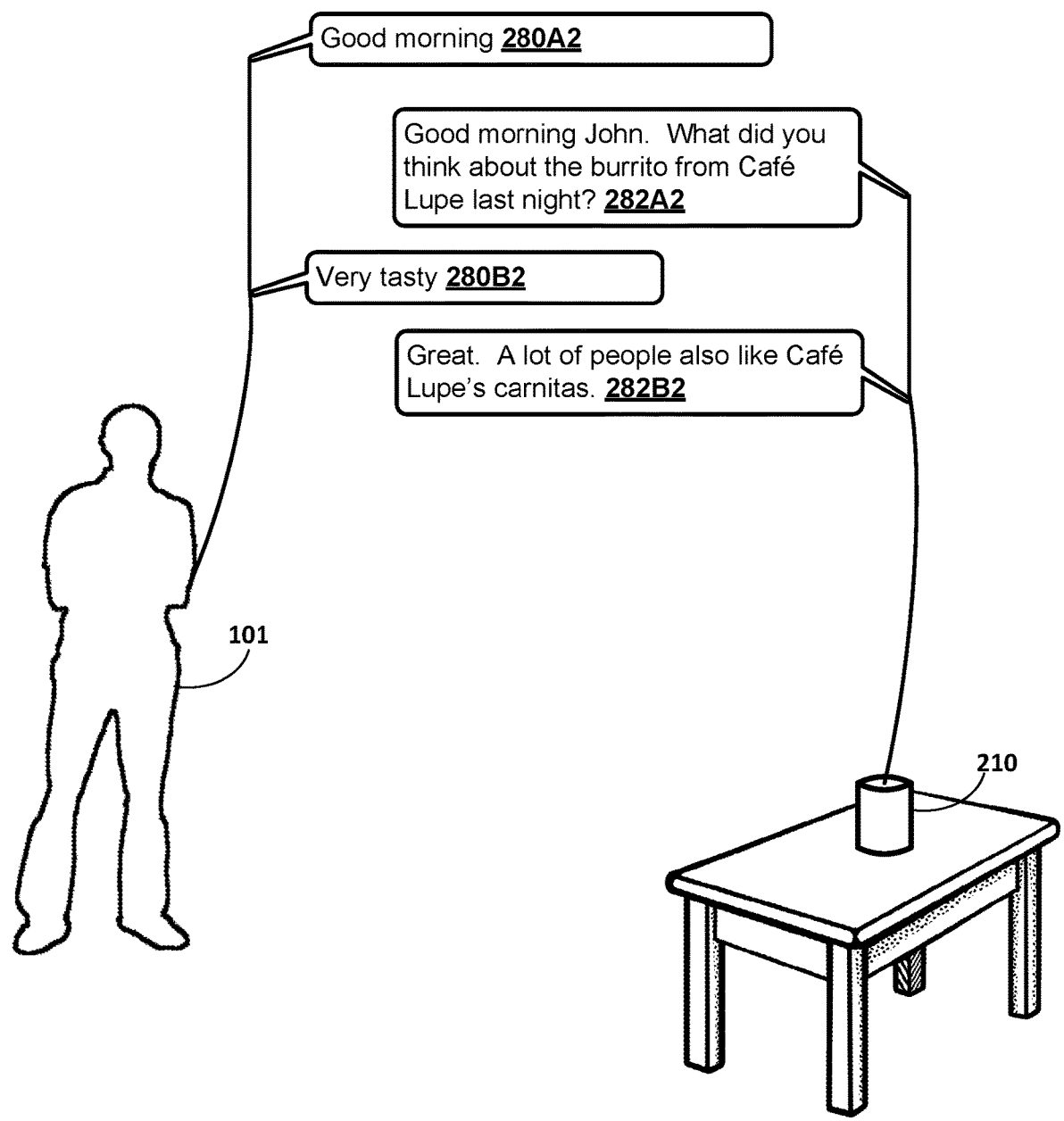
FIG. 2B2

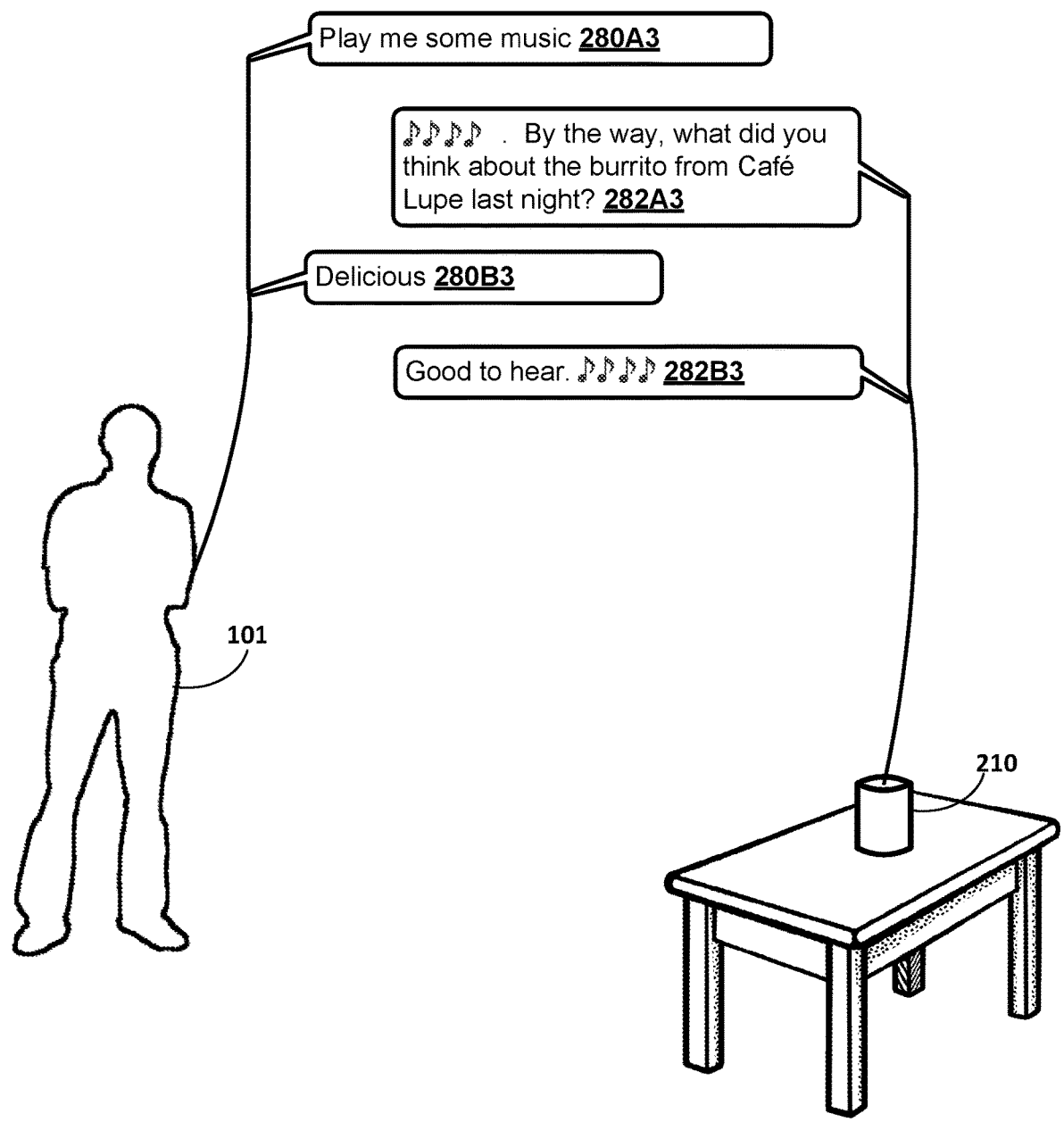
FIG. 2B3

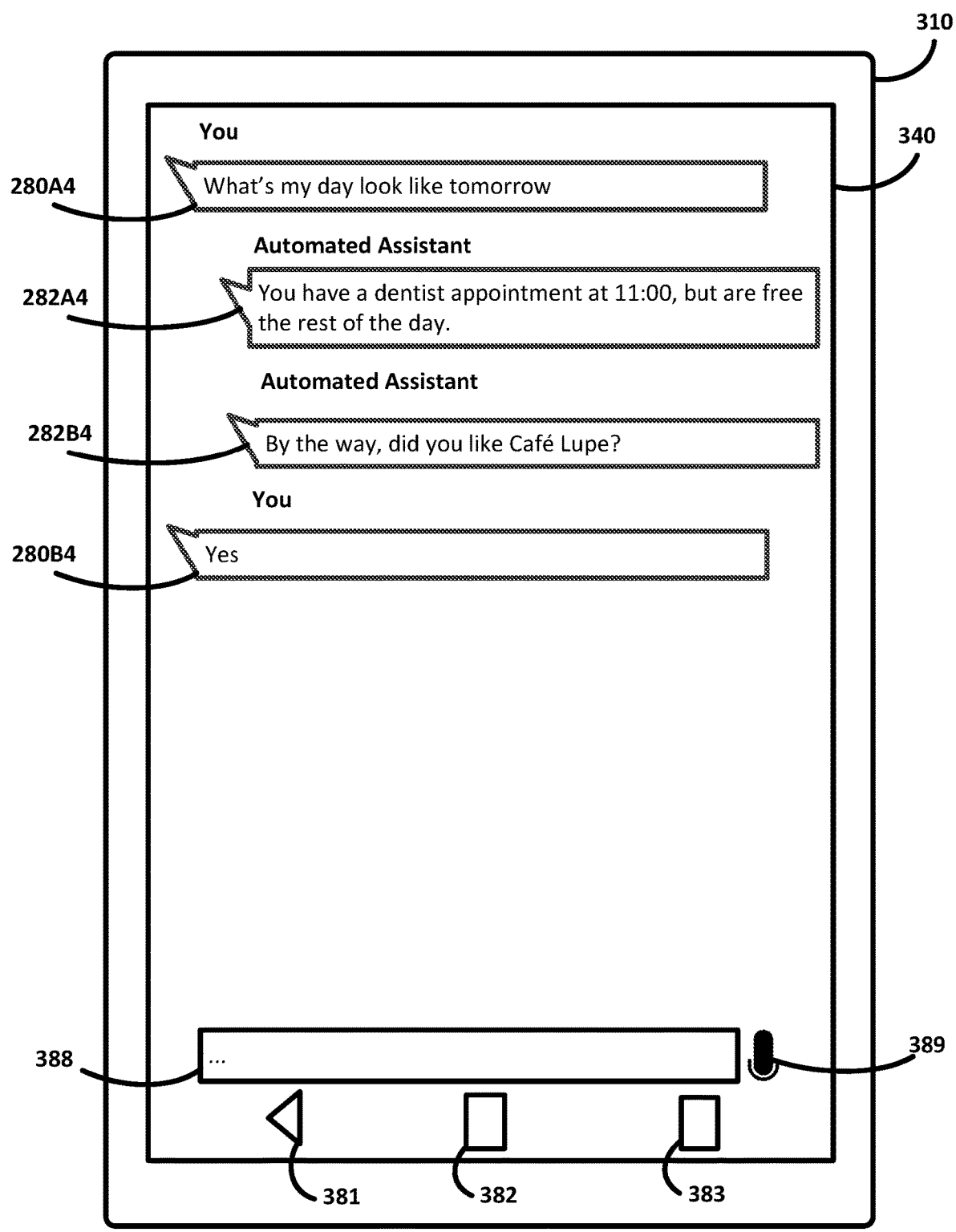
FIG. 2B4

PROVIDING PROMPT IN AN AUTOMATED DIALOG SESSION BASED ON SELECTED CONTENT OF PRIOR AUTOMATED DIALOG SESSION

BACKGROUND

Automated assistants (also known as "personal assistant modules", "mobile assistants", or "chat bots") may be interacted with by a user via a variety of computing devices, such as smart phones, tablet computers, wearable devices, automobile systems, standalone personal assistant devices, and so forth. The automated assistants receive input from the user (e.g., typed and/or spoken natural language input) and respond with responsive content (e.g., visual and/or audible natural language output).

SUMMARY

In response to an input from a user during a dialog session, an automated assistant may provide a suggestion and/or other content that is responsive to the input—and that includes one or more content parameters that are selected by the automated assistant from a plurality of candidate content parameters based on one or more factors. For example, in response to input of "where can I get a good burger?", the automated assistant may identify a plurality of candidate restaurants that serve burgers, but may select only a subset (e.g., one) of those for including in content responsive to the input.

This specification is directed to methods, apparatus, and computer readable media related to soliciting feedback from a user regarding one or more content parameters of a suggestion or other content provided by the automated assistant. The user's feedback may be used to influence future suggestions and/or other content subsequently provided, by the automated assistant in future dialog sessions, to the user and/or to other users.

In some implementations, content is provided to a user by an automated assistant in a dialog session between the user and the automated assistant—and the automated assistant provides a prompt that solicits user feedback related to the provided content in a future dialog session between the user and the automated assistant. In some of those implementations, the prompt is provided following input from the user and/or output from the automated assistant, in the future dialog session, that is unrelated to the content provided in the previous dialog session.

As one example, the future dialog session may be initiated by the user and may prompt the automated assistant to perform some "routine action" such as providing a summary of the user's calendar entries, providing news stories to the user, playing music for the user, etc. The automated assistant may perform some or all of the routine action, then provide the prompt. This may add some variance to the routine action and/or enhance the user experience by injecting a conversational prompt into the routine action. Moreover, as mentioned above, a user's feedback (direct or indirect) that is provided in response to the prompt may be utilized to influence future suggestions or other content subsequently provided, by the automated assistant, for presentation to the user—thereby increasing the likelihood that subsequent content provided to the user by the automated assistant is relevant to the user. Such an improvement in relevance of content provided by the automated assistant may enable desired content to be provided to the user more quickly, which may decrease various computational resources that may be consumed in a more prolonged dialog that may otherwise be required to identify the desired content.

In some implementations, a method performed by one or more processors is provided that includes, as part of a dialog session between a user and an automated assistant implemented by one or more of the processors: receiving natural language input that is based on user interface input provided by the user via a user interface input device; and providing, as a reply by the automated assistant to the natural language input, content that is responsive to the natural language input. The content is provided for presentation to the user via a user interface output device and the content includes at least one content parameter selected by the automated assistant from a plurality of candidate content parameters. The method further includes, as part of an additional dialog session between the user and the automated assistant that is temporally separated from the dialog session: providing a prompt that solicits feedback on the selected content parameter; receiving additional input that is responsive to the prompt; and using the additional input to influence a value stored in association with the content parameter. The value stored in association with the content parameter influences future providing of further content that includes the content parameter. The prompt is provided for presentation to the user via the user interface output device or an additional user interface output device. The prompt is generated to solicit feedback on the content parameter based on the content parameter being previously selected by the automated assistant and previously provided for presentation to the user as part of the dialog session. The additional input that is responsive to the prompt is based on additional user interface input provided by the user via the user interface input device or an additional user interface input device These and other implementations of technology disclosed herein may optionally include one or more of the following features.

In some implementations, the user initiates the additional dialog session with additional natural language input that is unrelated to the content of the previous dialog session. In some of those implementations, the method further includes, as part of the additional dialog session: providing additional dialog session output that is responsive to the additional natural language input and that is also unrelated to the content of the previous dialog session. Providing the prompt may occur following providing the additional dialog session output. In some versions of those implementations, the method further includes determining that one or more criteria are satisfied by at least one of: the additional natural language input, and the additional dialog session output. Providing the prompt may be further based on determining that the criteria are satisfied. The criteria may include, for example, the additional dialog session output being of a certain semantic type and/or an occurrence in the user prompt of at least one n-gram of a set of criteria n-grams.

In some implementations, the content is a suggestion to be acted upon by the user in the future and the method further includes determining that the user acted upon the suggestion after providing the content that includes the content parameter. Providing the prompt may be further based on determining that the user acted upon the suggestion.

In some implementations, the user interface input device or the additional user interface input device used to generate the additional input that is responsive to the prompt includes a microphone, and the method further includes: based on providing the prompt, preemptively activating at least one component configured to process the user interface input provided via the microphone.

In some implementations, the user initiates the additional dialog session and providing the prompt is contingent on the user having initiated the additional dialog session.

In some implementations, the method further includes, as part of the additional dialog session: prior to providing the prompt, providing additional dialog session output. Providing the prompt may occur following providing the additional dialog session output.

In some implementations, the method further includes: identifying an additional content parameter provided to the user as part of an additional prior dialog session between the user and the automated assistant; and determining, based on one or more criteria, to provide the prompt based on the content parameter instead of an alternative prompt that is based on the additional content parameter. In some of those implementations, the one or more criteria include corresponding temporal proximities of the providing of the content parameter and of the providing of the additional content parameter. In some of those implementations, the one or more criteria additionally or alternatively include semantic types assigned to the content parameter and the additional content parameter.

In some implementations, the content includes a suggestion for a particular physical location and for a particular item consumable at the particular location, and the content parameter identifies the particular item.

In some implementations, the content includes a suggestion for a particular physical location, and the content parameter identifies a category to which the particular physical location belongs.

In some implementations, the input and the additional input are both generated via the user interface input device and the content and the feedback prompt are both provided for presentation via the user interface output device. In some of those implementations, the user interface input device includes a microphone of a single device and the user interface output device includes a speaker of the single device.

In some implementations, the input is generated via the user interface input device of a first computing device, the content is provided for presentation via the user interface output device of the first computing device, and the prompt is provided for presentation via the additional user interface output device of an additional computing device.

In some implementations, a method performed by one or more processors is provided that includes: identifying, from a computer readable medium, a stored content parameter of content previously provided to a user as part of a prior dialog session between a user and an automated assistant implemented by one or more of the processors. The method further includes, as part of an additional dialog session between the user and the automated assistant that is temporally separated from the dialog session: providing a prompt that solicits feedback on the content parameter. The prompt is provided for presentation to the user via a user interface output device of a computing device of the user, and the prompt is generated to solicit feedback on the content parameter based on the content parameter being previously provided for presentation to the user as part of the prior dialog session. The method further includes, as part of the additional dialog session: receiving additional input that is responsive to the prompt; and using the additional input to influence a value stored in association with the content parameter. The additional input is based on additional user interface input provided by the user via a user interface input device of the computing device, and the stored value influences future providing of further content that includes the content parameter.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIGS. 2B1, 2B2, 2B3, and 2B4 illustrate different examples of providing, to the user in a dialog session that is separate from that of FIG. 2A, a feedback prompt that is based on selected content parameter(s) of FIG. 2A.

FIG. 4 is a flowchart illustrating an example method according to implementations disclosed herein.

DETAILED DESCRIPTION

Figure 1:
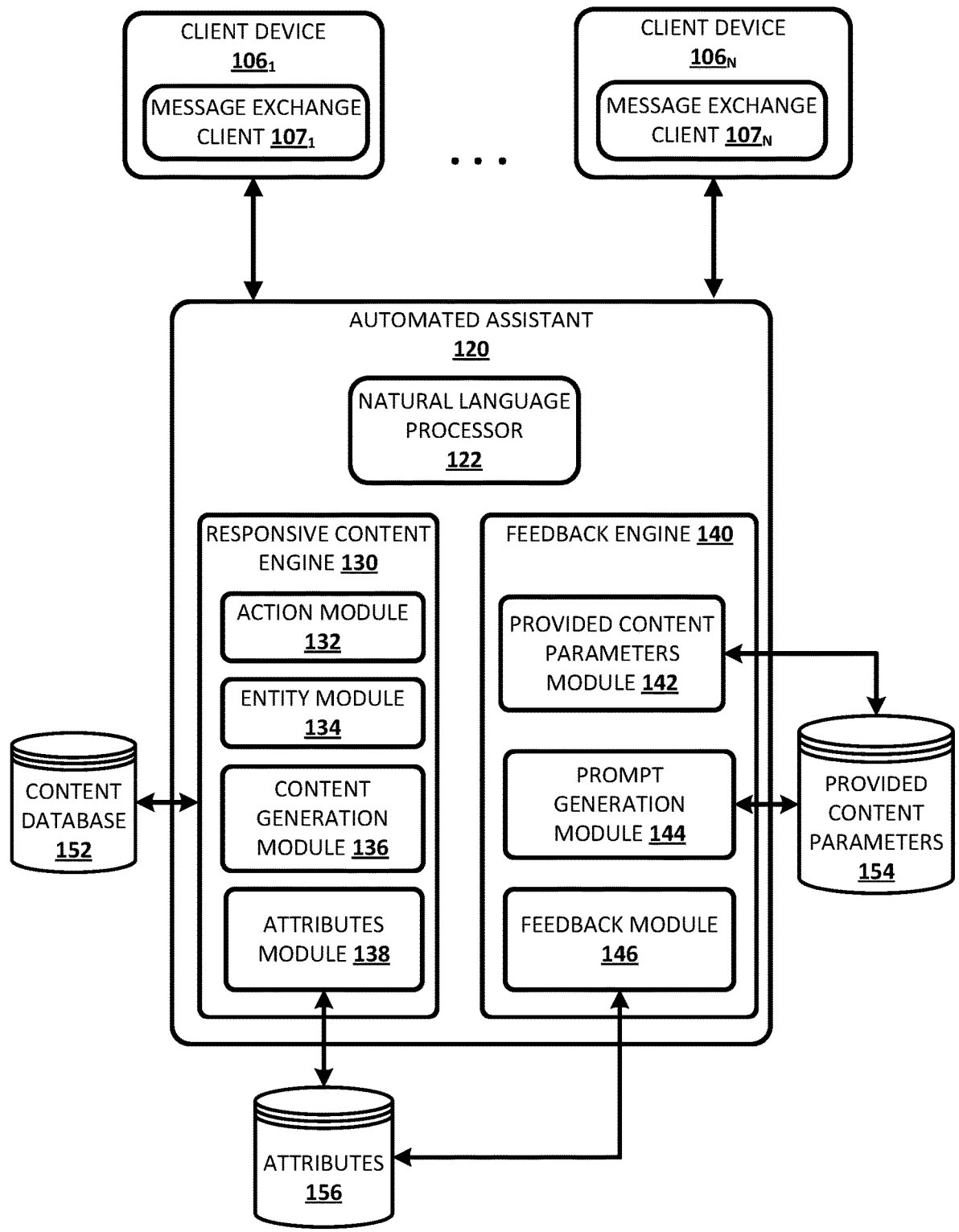
FIG. 1 is a block diagram of an example environment in which implementations disclosed herein may be implemented.

Now turning to FIG. 1, an example environment in which techniques disclosed herein may be implemented is illustrated. The example environment includes a plurality of client computing devices $106_{1-N}$ and an automated assistant 120. Although automated assistant 120 is illustrated in FIG. 1 as separate from the client computing devices $106_{1-N}$, in some implementations all or aspects of the automated assistant 120 may be implemented by one or more of the client computing devices $106_{1-N}$. For example, client device $106_1$ may implement one instance of or more aspects of automated assistant 120 and client device $106_N$ may also implement a separate instance of those one or more aspects of automated assistant 120. In implementations where one or more aspects of automated assistant 120 are implemented by one or more computing devices remote from client computing devices $106_{1-N}$, the client computing devices $106_{1-N}$ and those aspects of automated assistant 120 may communicate via one or more networks such as a local area network (LAN) and/or wide area network (WAN) (e.g., the Internet).

The client devices $106_{1-N}$ may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), and/or a wearable apparatus of the user that includes a computing device (e.g., a watch of the user having a computing device, glasses of the user having a computing device, a virtual or augmented reality computing device). Additional and/or alternative client computing devices may be provided. In some implementations, a given user may communicate with automated assistant 120 utilizing a plurality of client computing devices that collectively from a coordinated "ecosystem" of computing devices. However, for the sake of brevity, some examples described in this specification will focus on a user operating a single client computing device 106.

Each of the client computing devices $106_{1-N}$ may operate a variety of different applications, such as a corresponding one of the message exchange clients $107_{1-N}$. Message exchange clients $107_{1-N}$ may come in various forms and the forms may vary across the client computing devices $106_{1-N}$ and/or multiple forms may be operated on a single one of the client computing devices $106_{1-N}$. In some implementations, one or more of the message exchange clients $107_{1-N}$ may come in the form of a short messaging service ("SMS") and/or multimedia messaging service ("MMS") client, an online chat client (e.g., instant messenger, Internet relay chat, or "IRC," etc.), a messaging application associated with a social network, a personal assistant messaging service dedicated to conversations with automated assistant 120, and so forth. In some implementations, one or more of the message exchange clients $107_{1-N}$ may be implemented via a webpage or other resources rendered by a web browser (not depicted) or other application of client computing device 106.

As described in more detail herein, the automated assistant 120 engages in dialog sessions with one or more users via user interface input and output devices of one or more client devices $106_{1-N}$. In some implementations, the automated assistant 120 may engage in a dialog session with a user in response to user interface input provided by the user via one or more user interface input devices of one of the client devices $106_{1-N}$. In some of those implementations, the user interface input is explicitly directed to the automated assistant 120. For example, one of the message exchange clients $107_{1-N}$ may be a personal assistant messaging service dedicated to conversations with automated assistant 120 and user interface input provided via that personal assistant messaging service may be automatically provided to automated assistant 120. Also, for example, the user interface input may be explicitly directed to the automated assistant 120 in one or more of the message exchange clients $107_{1-N}$ based on particular user interface input that indicates the automated assistant 120 is to be invoked. For instance, the particular user interface input may be one or more typed characters (e.g., @AutomatedAssistant), user interaction with a hardware button and/or virtual button (e.g., a tap, a long tap), a verbal command (e.g., "Hey Automated Assistant"), and/or other particular user interface input. In some implementations, the automated assistant 120 may engage in a dialog session in response to user interface input, even when that user interface input is not explicitly directed to the automated assistant 120. For example, the automated assistant 120 may examine the contents of user interface input and engage in a dialog session in response to certain terms being present in the user interface input and/or based on other cues.

Each of the client computing devices $106_{1-N}$ and automated assistant 120 may include one or more memories for storage of data and software applications, one or more processors for accessing data and executing applications, and other components that facilitate communication over a network. The operations performed by one or more of the client computing devices $106_{1-N}$ and/or by the automated assistant 120 may be distributed across multiple computer systems. Automated assistant 120 may be implemented as, for example, computer programs running on one or more computers in one or more locations that are coupled to each other through a network.

Automated assistant 120 may include a natural language processor 122, a responsive content engine 130, and a feedback engine 140. In some implementations, one or more of the engines and/or modules of automated assistant 120 may be omitted, combined, and/or implemented in a component that is separate from automated assistant 120. Automated assistant 120 engages in dialog sessions with one or more user(s), via associated client devices $106_{1-N}$, to provide responsive content generated by responsive content engine 130 and/or to provide feedback prompts generated by feedback engine 140.

In some implementations, responsive content engine 130 generates responsive content in response to various inputs generated by a user of one of the client devices $106_{1-N}$ during a dialog session with the automated assistant 120. The responsive content engine 130 provides the responsive content (e.g., over one or more networks when separate from a client device of a user) for presenting to the user as part of the dialog session. For example, responsive content engine 130 may generate responsive content in in response to free-form natural language input provided via one of the client devices $106_{1-N}$. As used herein, free-form input is input that is formulated by a user and that is not constrained to a group of options presented for selection by the user.

In response to some inputs, the responsive content engine 130 may generate content with one or more content parameters that are selected from a plurality of candidate content parameters. For example, the provided input may be "give me directions to a good coffee shop" and the responsive content engine 130 may determine directions to a particular coffee shop by first selecting a "good coffee shop" from a plurality of available coffee shops based on one or more factors. Further, the responsive content engine 130 may determine the directions by selecting them from a plurality of candidate directions (e.g., shortest vs. fastest; include freeways vs. exclude freeways) based on one or more factors. Additional description of implementations of responsive content engine 130 are provided below.

In some implementations, feedback engine 140 stores various content parameters that were selected by the responsive content engine 130 and provided to a user in a dialog session—and generates a prompt soliciting feedback from the user regarding one or more of the selected content parameters. The feedback engine 140 provides the feedback prompt for presenting to the user as part of a dialog session. In many implementations, the feedback engine 140 provides a feedback prompt for presenting to the user as part of a dialog session that is separate from the dialog session in which content parameter(s) that are the focus of the feedback prompt were provided to the user. The feedback engine 140 may further utilize feedback provided by the user in response to the prompt to influence future suggestions and/or other content subsequently provided, by the automated assistant 120 in future dialog sessions, to the user and/or to other users.

As mentioned above, in some implementations content is provided to a user by the automated assistant 120 in a dialog session between the user and the automated assistant—and the automated assistant 120 provides, in a future dialog session between the user and the automated assistant, a feedback prompt that solicits user feedback related to the provided content. In some of those implementations, the prompt is provided following input from the user and/or output from the automated assistant 120, in the future dialog session, where that input and/or output is unrelated to the content provided in the previous dialog session.

As used herein, a "dialog session" may include a logically-self-contained exchange of one or more messages between a user and the automated assistant 120. The automated assistant 120 may differentiate between multiple dialog sessions with a user based on various signals, such as passage of time between sessions, change of user context (e.g., location, before/during/after a scheduled meeting, etc.) between sessions, detection of one or more intervening interactions between the user and a client device other than dialog between the user and the automated assistant (e.g., the user switches applications for a while, the user walks away from then later returns to a standalone voice-activated product), locking/sleeping of the client device between sessions, change of client devices used to interface with one or more instances of the automated assistant 120, and so forth.

In some implementations, when the automated assistant 120 provides a prompt that solicits user feedback, the automated assistant 120 may preemptively activate one or more components of the client device (via which the prompt is provided) that are configured to process user interface input to be received in response to the prompt. For example, where the user interface input is to be provided via a microphone of the client device 106$_1$, the automated assistant 120 may provide one or more commands to cause: the microphone to be preemptively "opened" (thereby preventing the need to hit an interface element or speak a "hot word" to open the microphone), a local speech to text processor of the client device 106$_1$ to be preemptively activated, a communications session between the client device 106$_1$ and a remote speech to text processor to be preemptively established, and/or a graphical user interface to be rendered on the client device 106$_1$ (e.g., an interface that includes one or more selectable elements that may be selected to provide feedback). This may enable the user interface input to be provided and/or processed more quickly than if the components were not preemptively activated.

In some implementations, the automated assistant 120 may provide a prompt that solicits user feedback in a future dialog session based on user input and/or responsive output of the automated assistant 120 in that future dialog session satisfying one or more criteria. For example, a prompt may be provided only when the user initiates the dialog session with any user input and/or with certain user input, such as any natural language input and/or certain natural language input. Also, for example, a prompt may be provided only when the user input and/or responsive output is of one or more certain semantic types and/or is not of one or more other certain semantic types. As yet another example, a prompt may be provided only when the user input and/or responsive output includes one or more certain n-grams and/or does not include one or more other certain n-grams. In some implementations, the criteria may be selected to promote the likelihood of providing the prompt when dialog of a dialog session is conversational and/or light and/or to demote the likelihood of providing the prompt when the dialog of a dialog session is "task oriented" (e.g., to prevent distracting the user from the task).

In some implementations, the criteria may additionally or alternatively be selected to maintain privacy of the user to which the prompt is being provided. For example, where voice-based natural language input is provided, the criteria may be that the voice-based input conforms to a voice profile of the user and/or that the voice-based input lacks certain background noise (e.g., lacks background noise that indicates other users may be present). Also, for example, the criteria may be that the user input and/or responsive output includes content that is personal to the user (e.g., responsive output that provides a summary of the user's calendar items for the day), which may indicate that the user is in a setting that the user has deemed private.

In some implementations, content parameters from multiple distinct suggestions provided to the user may be available to the feedback engine 140 for generating a prompt to provide to the user in a given future dialog session. In some of those implementations, the feedback engine 140 may select, based on one or more criteria, a subset (e.g., one) of those multiple suggestions for providing in a given prompt. For example, whether a content parameter of a given suggestion is utilized in generating and/or providing a prompt may be based on a category of the given suggestion (e.g., dining suggestions may be more likely to be selected than music suggestions), a sub-category of the given suggestion (e.g., French cuisine suggestions may be more likely to be selected than Mexican cuisine suggestions), a time at which the given suggestion was provided (e.g., more recent suggestions may be more likely to be selected than less recent suggestions), and/or a category of the given suggestion and a time at which the given suggestion was provided (e.g., a music suggestion from three days ago may not be provided, whereas a dining suggestion from three days ago may be provided).

In some implementations, a prompt soliciting feedback on a content parameter of a provided suggestion to be acted upon by the user in the future may be provided by the automated assistant 120 based on determining that the user actually acted upon the suggestion. This may mitigate the risk that the user is prompted to provide feedback on a content parameter with which the user never interacted—which may be confusing to the user and/or may unnecessarily consume computational resources in providing the prompt. In some implementations, determining that a user acted upon the suggestion may be based on dialog between the user and the automated assistant 120 in a dialog session that is prior to the dialog session in which the prompt is provided (e.g., dialog via which the user actually acted upon the suggestion). In some implementations, determining that a user acted upon the suggestion may be based on one or more additional or alternative signals, such as signals that are not generated from using the automated assistant 120 to act upon the suggestion. For example, assume the automated assistant 120 provides the user with a suggestion for a coffee shop to visit. Before a prompt soliciting feedback on the coffee shop is provided to the user in a future dialog session, it may first be determined that the user actually visited the coffee shop based on location data from a mobile client device of the user, transaction data associated with the user, and/or other signals.

Natural language processor 122 of automated assistant 120 processes natural language input generated by users via client devices $106_{1-N}$ and generates annotated output for use by one or more other components of the automated assistant 120, such as responsive content engine 130 and/or feedback engine 140. For example, the natural language processor 122 may process natural language free-form input that is generated by a user via one or more user interface input devices of client device $106_1$. The generated annotated output includes one or more annotations of the natural language input and optionally one or more (e.g., all) of the terms of the natural language input.

In some implementations, the natural language processor 122 is configured to identify and annotate various types of grammatical information in natural language input. For example, the natural language processor 122 may include a part of speech tagger configured to annotate terms with their grammatical roles. For example, the part of speech tagger may tag each term with its part of speech such as "noun," "verb," "adjective," "pronoun," etc. Also, for example, in some implementations the natural language processor 122 may additionally and/or alternatively include a dependency parser configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the natural language processor 122 may additionally and/or alternatively include an entity tagger configured to annotate entity references in one or more segments such as references to people, organizations, locations, and so forth. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database (e.g., content database 152) to resolve a particular entity.

In some implementations, the natural language processor 122 may additionally and/or alternatively include a coreference resolver configured to group, or "cluster," references to the same entity based on one or more contextual cues. For example, the coreference resolver may be utilized to resolve the term "it" to "Asia Village" in the natural language input "I like the stir fry dish at Asia Village. Order it please."

In some implementations, one or more components of the natural language processor 122 may rely on annotations from one or more other components of the natural language processor 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 122 may use related prior input and/or other related data outside of the particular natural language input to determine one or more annotations.

As mentioned above, the responsive content engine 130 utilizes one or more resources in generating suggestions and/or other content to provide during a dialog session with a user of one of the client devices $106_{1-N}$. The responsive content engine 130 may include an action module 132, an entity module 134, a content generation module 136, and an attributes module 138.

The action module 132 of the responsive content engine 130 utilizes natural language input received from client computing devices $106_{1-N}$ and/or annotations of natural language input provided by natural language processor 122, to determine at least one action related to the natural language input. In some implementations, the action module 132 may determine an action based on one or more terms included in the natural language input. For example, the action module 132 may determine an action based on the action being mapped, in one more computer readable media, to one or more terms included in the natural language input. For instance, an action of "making a restaurant reservation" may be mapped to one or more terms such as "book it", "reserve", "reservation", "get me a table", etc. Also, for instance, an action of "providing a daily briefing" may be mapped to one or more terms such as "tell me about my day", "what's going on today", "good morning", etc. As yet another instance, an action of "providing small talk" may be mapped to one or more terms such as "hello", "what's up", etc.

In some implementations, the action module 132 may determine an action based at least in part on one or more candidate entities determined by entity module 134 based on natural language input of a dialog session. For example, assume natural language input of "book it" and that "book it" is mapped to a plurality of distinct actions such as "making a restaurant reservation", "making a hotel reservation", "making an appointment", etc. In such a situation, the action module 132 may determine which of the actions is the correct action based on candidate entities determined by entity module 134. For example, if entity module 134 determines only a plurality of restaurants as candidate entities, the action module 132 may determine an action of "making a restaurant reservation" is the correct action.

Entity module 134 determines candidate entities based on input provided by one or more users via user interface input device(s) during a dialog session between the user(s) and the automated assistant 120. The entity module 134 utilizes one or more resources in determining candidate entities and/or in refining those candidate entities. For example, the entity module 134 may utilize the natural language input itself, annotations provided by natural language processor 122, attribute(s) provided by attributes module 138, and/or content of content database 152.

Content database 152 may be provided on one or more non-transitory computer readable media and may define a plurality of entities, properties of each of the entities, and optionally relationships between those entities. For example, the content database 152 may include an identifier of a particular restaurant and one or more properties of that restaurant such as location, cuisine type(s), dishes available, operating hours, aliases, whether reservations are accepted, a rating of that restaurant, a price indication, etc. The content database 152 may additionally or alternatively include a plurality of protocols that are each applicable to one or more entities and/or one or more actions. For example, each protocol may define one or more necessary and/or desired content parameters to perform an associated action and/or to perform the associated action with associated entity/entities.

Content generation module 136 engages in a dialog with one or more user(s), via associated client devices, to generate suggestions for performing an action and/or to generate other content. The content generation module 136 optionally utilizes one or more resources in generating the content. For example, the content generation module 136 may utilize current and/or past natural language input of a user during a dialog session, annotations of that input provided by natural language processor 122, attribute(s) provided by attributes module 138, one or more entities determined by entity module 134, and/or one or more actions determined by action module 132.

Content generation module 136 may generate, and provide in a dialog session, content that includes one or more content parameters selected from a plurality of candidate content parameters. The content generation module 136 may further provide the selected content parameters of the provided content to feedback engine 140 for utilization in generating feedback prompts as described herein.

As one example, provided input in a dialog session may be "give me directions to a good coffee shop" and the content generation module 136 may determine directions to a particular coffee shop by first selecting a "good coffee shop" from a plurality of available coffee shops (e.g., based on candidate action(s) from action module 132 and/or candidate entities from entity module 134) based on one or more factors. Further, the content generation module 136 may determine the directions by selecting them from a plurality of candidate directions (e.g., shortest vs. fastest route; include freeways vs. exclude freeways) based on one or more factors. The content generation module 136 may optionally communicate with one or more external components in determining the particular coffee shop and/or the directions. The content generation module 136 may provide the selected content parameters to the feedback engine 140. For example, the content generation module 136 may provide a content parameter that indicates the selected particular coffee shop and may provide a content parameter that indicates one or more parameters of the selected directions (e.g., that indicates they were the "fastest route" directions).

As another example, the provided input may be "tell me about my day" and the content generation module 136 may select one or more calendar entries of the user, local weather for the user, one or more news stories tailored to the user, and/or other content for providing in response to the input. The content generation module 136 may select the content based on various factors, such as the type of the content (e.g., "calendar entry", "news story"), individual and/or collective size (e.g., temporal length) of the content, etc. The content generation module 136 may provide the selected content parameters to the feedback engine 140. For example, the content generation module 136 may provide a content parameter that indicates that "calendar entries" and "news stories" were provide to the user and/or may provide a content parameter that indicates that a length of an audible presentation of the entirety of the content in the dialog session was "2 minutes".

The attributes module 138 determines one or more attributes applicable to a user engaged in a dialog session with the automated assistant 120, and provides those attributes to one or more other components of the responsive content engine 130 for utilization in generating content to provide to the user in the dialog session. The attributes may be utilized by the other components of the responsive content engine 130, for example, in determining a particular entity for an action, in determining one or more criteria for the action, and/or in generating output for a dialog with the one or more users. The attributes module 138 is in communication with attributes database 156 that may store one attributes that are personal to the user and/or that are applicable to a group of users that include the user. As described herein, the values of various attributes of attributes database 156 may be influenced based on inputs provided by one or more users in response to feedback prompts. For example, an attribute of attributes database 156 may include a value associated with a particular restaurant that indicates desirability of the particular restaurant for a particular user. The value may be based on input(s) provided by the particular user in response to feedback prompt(s) directed to the particular restaurant and provided to the particular user in dialog session(s). The attributes database 156 may additionally or alternatively include other attributes that are personal to a user, but whose values are not necessarily influenced by response to feedback prompts. For example, such attributes may include a current location of the user (e.g., based on GPS or other location data), a time constraint of the user (e.g., based on an electronic calendar of the user), and/or attributes of the user based on user activities across a plurality of Internet services.

As mentioned above, the feedback engine 140 stores various content parameters that were selected by the responsive content engine 130 and provided to a user in a dialog session—and generates prompts soliciting feedback from the user regarding one or more of the content parameters. The feedback engine 140 may include a provided content parameters module 142, a prompt generation module 144, and a feedback module 146.

The provided content parameters module 142 stores, in association with a user in provided content parameters database 154, content parameters of content provided for presentation to a user in dialog sessions with the user. For example, for provided input in a dialog session of "what's a good coffee shop", the content generation module 136 may select a "good coffee shop" from a plurality of available coffee shops, provide responsive output that indicates the selected "good coffee shop", and provide a content parameter that indicates the selected "good coffee shop" to feedback engine 140. The provided content parameters module 142 may store the provided content parameter in association with the user in the provided content parameters database 154.

The prompt generation module 144 generates feedback prompts soliciting feedback from a user regarding one or more of the content parameters stored in association with the user in provided content parameters database 154. In some implementations, the prompt generation module 144 further determines when and/or how a feedback prompt should be provided to the user. For example, the prompt generation module 144 may determine to provide a feedback prompt for presentation to a user as part of a dialog session based on: the dialog session being separate from the dialog session in which content parameter(s) that are the focus of the feedback prompt were provided to the user; user input and/or responsive output of the dialog session satisfying one or more criteria; based on verifying that the user acted upon a suggestion on which the content parameter(s) are based; and/or based on other criteria. The prompt generation module 144 may work in concert with the responsive content engine 130 to interject generated feedback prompts in certain dialog sessions being managed by the responsive content engine 130. In some implementations, the prompt generation module 144 and/or other components of the feedback engine 140 may be included in the responsive content engine 130.

In some implementations, content parameters from multiple distinct suggestions provided to the user may be available to the prompt generation module 144 for generating a prompt to provide to the user in a given dialog session. In some of those implementations, the prompt generation module 144 may select, based on one or more criteria, a subset (e.g., one) of those multiple suggestions for providing in a given prompt.

The feedback module 146 utilizes feedback provided by the user in response to the prompt to influence future suggestions and/or other content subsequently provided, by the automated assistant 120 in future dialog sessions, to the user and/or to other users. In some implementations, the feedback module 146 utilizes one or more instances of feedback to adjust values associated with one or more attributes of attributes database 156. The adjusted values may be personal to the user and/or applicable to a group of users (e.g., all users). In some implementations, the feedback module 146 may utilize annotations provided by natural language processor 122 in determining the influence that one or more instances of feedback will have on an associated attribute. For example, the natural language processor 122 may include a sentiment classifier, may provide annotations that indicate sentiment of provided feedback, and the feedback module 146 may utilize the indicated sentiment to adjust the value. For instance, for a feedback prompt of "How did you like Coffee Shop A" and user provided feedback of "it was great", the feedback module 146 may receive an annotation that indicates "it was great" is associated with very positive feedback. Based on such an annotation, the feedback module 146 may promote a value of an attribute associated with "Coffee Shop A."

Figure 2A:
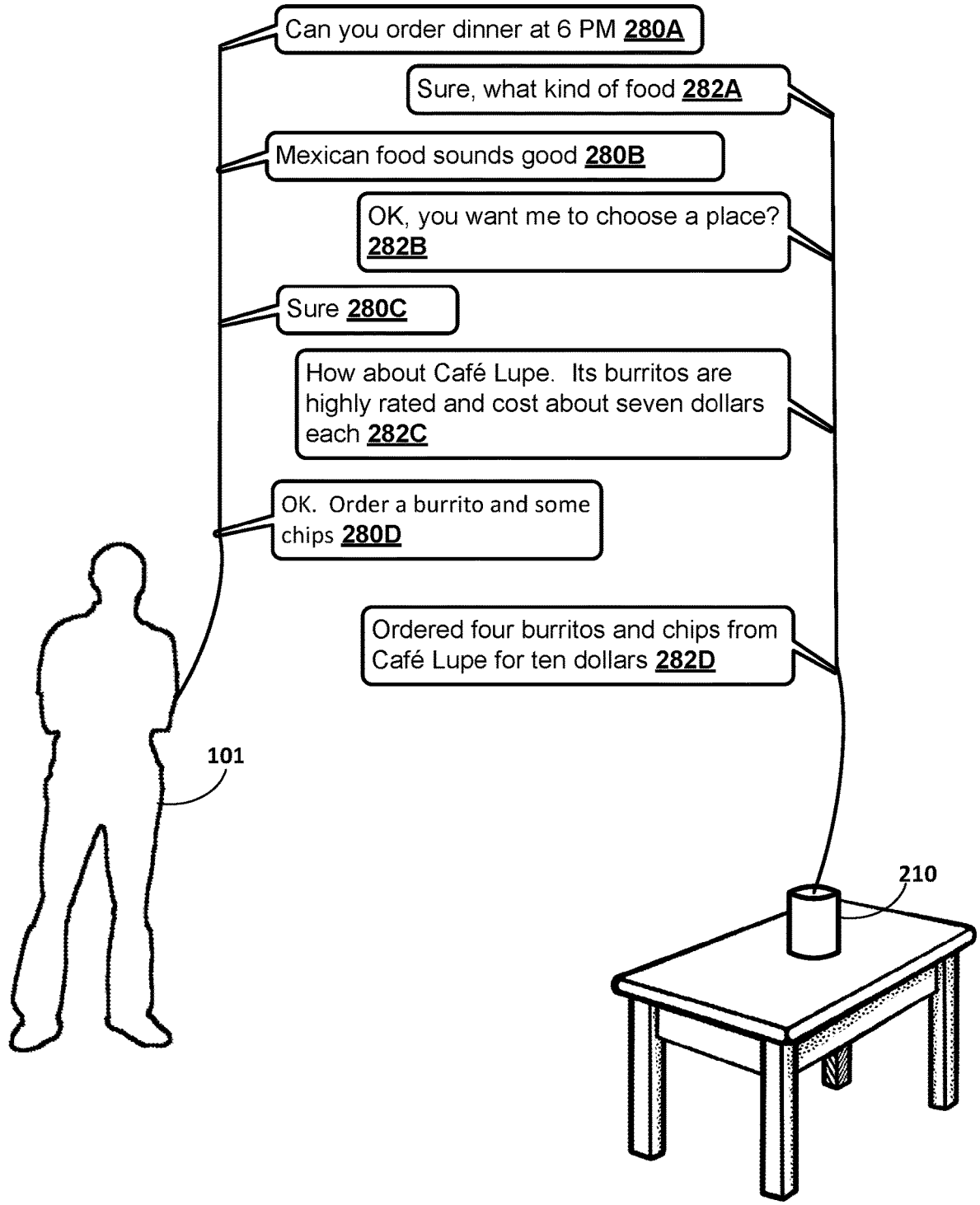
FIG. 2A illustrates an example of a dialog session in which the automated assistant provides, to a user, content with content parameters selected from a plurality of candidate content parameters.
Figure 3A:
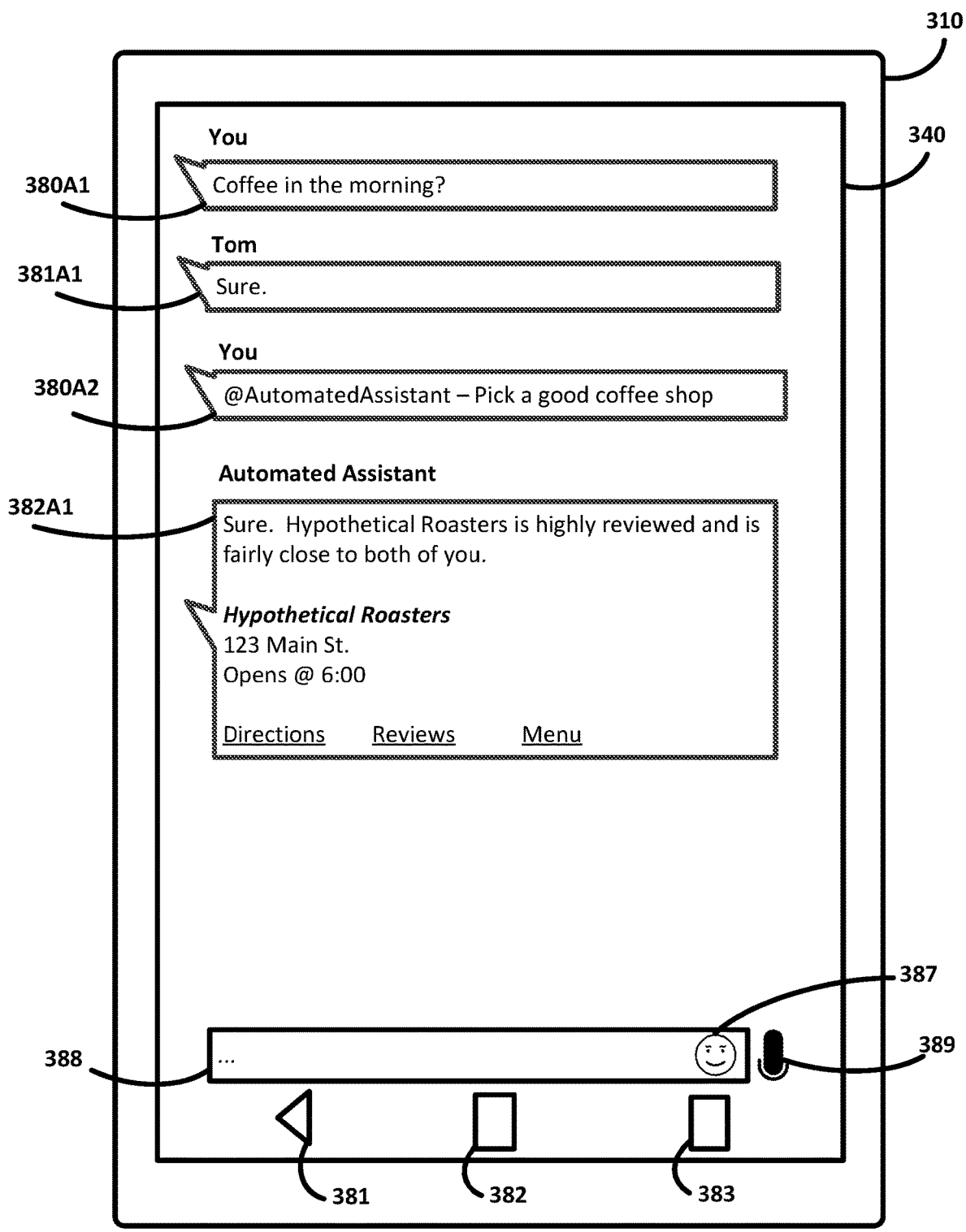
FIG. 3A illustrates another example of a dialog session in which the automated assistant provides, to a user, content with content parameters selected from a plurality of candidate content parameters.
Figure 3B:
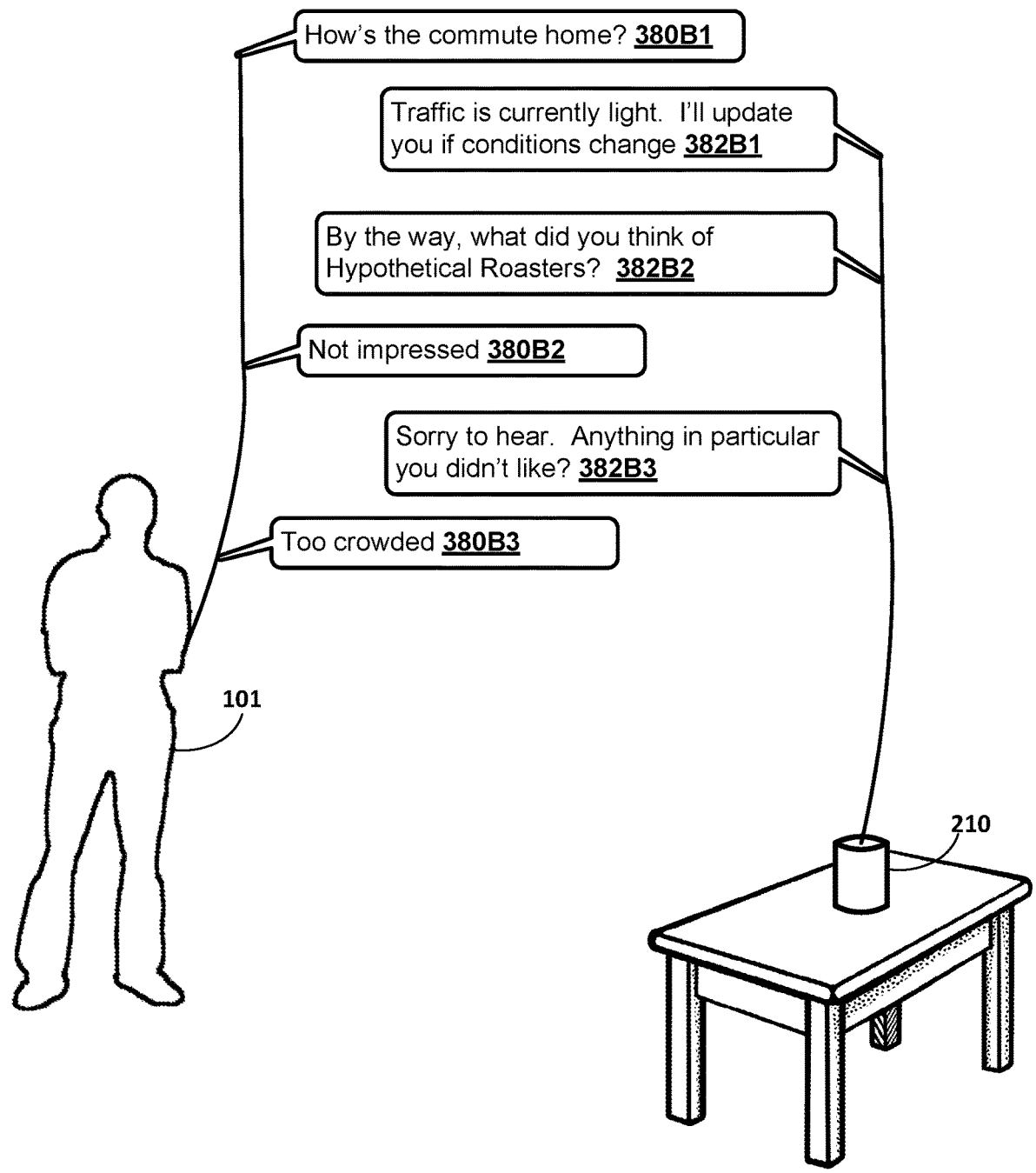
FIG. 3B illustrates an example of providing, to the user in a dialog session that is separate from that of FIG. 3A, a feedback prompt that is based on selected content parameter(s) of FIG. 3A.
Figure 4:
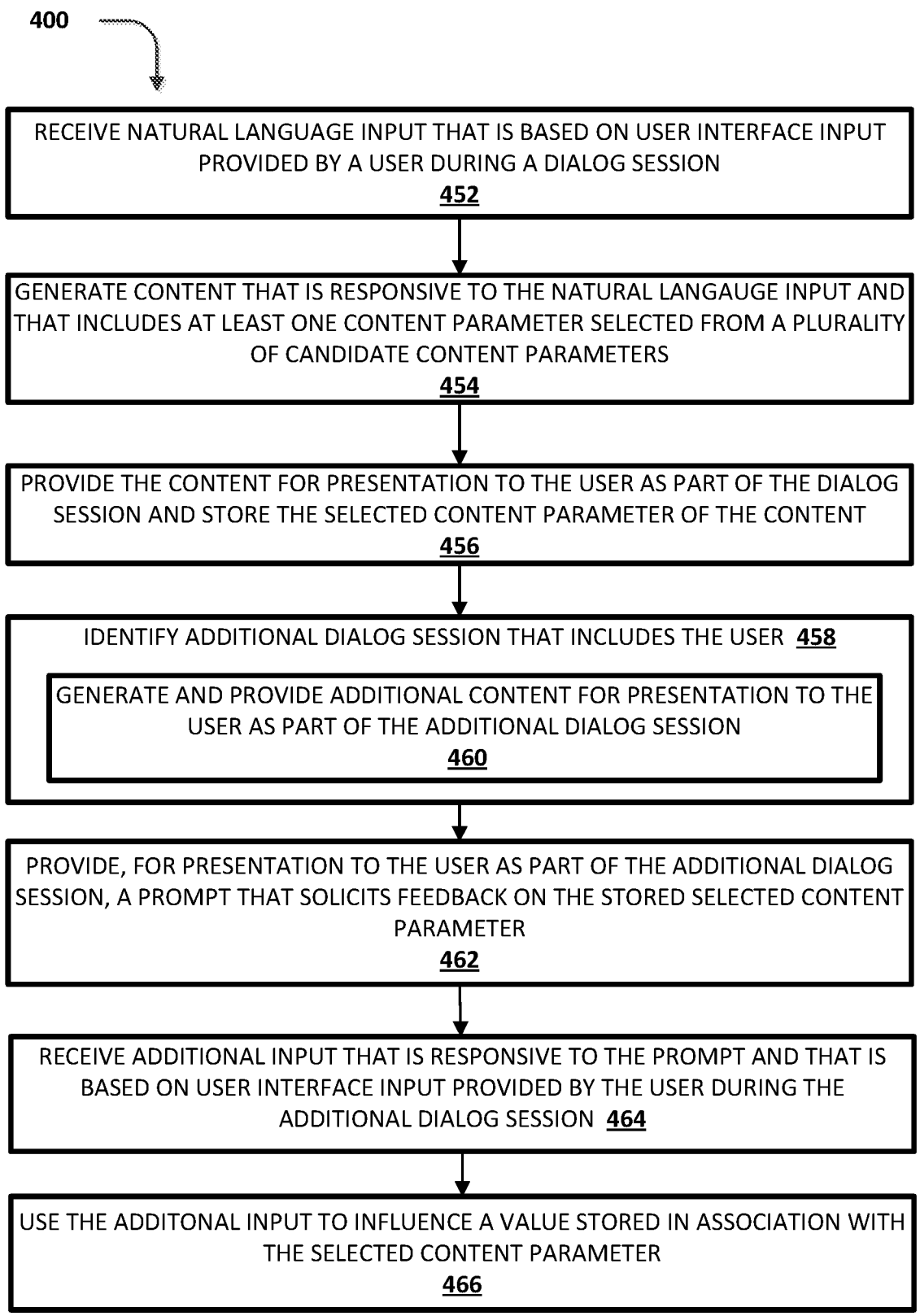

Referring now to FIGS. 2A, 2B1, 2B2, 2B3, and 2B4, examples of various implementations disclosed herein are described. FIG. 2A illustrates an example of a dialog session in which the automated assistant provides, to a user, content with content parameters selected from a plurality of candidate content parameters. FIGS. 2B1-2B4 each illustrate a different example of providing feedback prompt(s) to the user in a separate dialog session, where the feedback prompts are based on the selected content parameters.

FIG. 2A illustrates a computing device 210 that includes one or more microphones and one or more speakers and illustrates examples of dialog session that may occur, via the microphone(s) and speaker(s), between a user 101 of the computing device 210 and the automated assistant 120 according to implementations described herein. One or more aspects of the automated assistant 120 may be implemented on the computing device 210 and/or on one or more computing devices that are in network communication with the computing device 210.

In FIG. 2A, the user provides natural language input 280A of "Can you order dinner at 6 PM" to initiate a dialog session between the user and the automated assistant 120. In response to the natural language input 280A, the automated assistant 120 provides natural language output 282A of "Sure, what kind of food." The user then provides natural language input 280B that indicates the user would like Mexican cuisine. The automated assistant 120 then provides natural language output 282B that asks the user if the user would like the automated assistant to choose a particular restaurant, to which the user responds affirmatively with natural language input 280C.

The automated assistant 120 then provides natural language output 282C that is a suggestion. The suggestion of natural language output 282C includes a particular restaurant (Café Lupe) selected from a plurality of candidate "Mexican cuisine" restaurants and further includes a particular dish ("burrito") selected from a plurality of candidate dishes available at the particular restaurant.

The user then provides natural language input 280D that directs the automated assistant 120 to order a burrito and some chips from Café Lupe. The automated assistant 120 then provides natural language output 282D to confirm that the user's request of input 280D has been fulfilled by the automated assistant 120 (optionally via one or more additional external components).

In the dialog session of FIG. 2A, the automated assistant 120 selected the location "Café Lupe" and the dish type "burrito" from a plurality of candidate options and presents those selections to the user as part of the dialog session. Further, the automated assistant 120 can determine that the user acted upon the suggestion since the user did so in the same dialog session (by ordering the burritos from Café Lupe). Based on recommending the location and the dish type, and optionally based on determining that the user acted upon the suggested location and dish type, the automated assistant 120 may store content parameters that indicate the suggested location and dish type. For example, the automated assistant 120 may store, in the provided content parameters database 154 in association with the user, an indication of those selected and provided content parameters.

FIG. 2B1 provides one example of providing a feedback prompt to the user based on the "Café Lupe" content parameter stored in response to the dialog session of FIG. 2A. In FIG. 2B1, the user provides natural language input 280A1 of "Tell me about my day" to initiate a dialog session between the user and the automated assistant 120. The dialog session of FIG. 2B1 is separate from that of FIG. 2A. For example, the dialog session of FIG. 2B1 may be determined to be a separate dialog session based on passage of at least a threshold amount of time since the dialog session of FIG. 2A and/or based on other criteria.

The automated assistant 120 responds to the natural language input 280A1 with responsive natural language output 282A1 that includes a summary of the user's calendar, along with a local forecast and a traffic report. Even though the input 280A1 and the output 282A1 are unrelated to the content of the dialog session of FIG. 2A, the automated assistant 120 then provides feedback prompt 282B1 that solicits feedback on the "Café Lupe" content parameter. As described herein, the automated assistant 120 may provide the feedback prompt 282B1 based on various criteria such as the dialog session of FIG. 3B1 being separate from that of FIG. 3A, the input 380A1 and/or output 382A1 satisfying one or more criteria such as being considered "routine", and/or other criteria.

The user responds to the feedback prompt 282B1 with positive natural language input 280B1 and the automated assistant replies with confirmatory natural language output 382C1. The automated assistant 120 may utilize the positive natural language input 280B1 to positively influence a value associated with the "Café Lupe" content parameter. For example, the automated assistant 120 may adjust the value to increase the likelihood that "Café Lupe" and/or restaurants similar to Café Lupe will be provided in future dialog sessions with the user and/or in future dialog sessions with other users.

FIG. 2B2 provides an example of providing a feedback prompt to the user based on the "burrito" content parameter stored in response to the dialog session of FIG. 2A. The dialog session of FIG. 2B2 may be one that occurs in lieu of, or in addition to, that of FIG. 2B1. In FIG. 2B2, the user provides natural language input 280A2 of "Good morning" to initiate a dialog session between the user and the automated assistant 120. The dialog session of FIG. 2B2 is separate from that of FIG. 2B. For example, the dialog session of FIG. 2B1 may be determined to be a separate dialog session based on passage of at least a threshold amount of time since the dialog session of FIG. 2A and/or based on other criteria.

The automated assistant 120 responds to the natural language input 280A2 with responsive natural language output 282A2 that includes responsive content of "Good morning John". Even though the input 280A2 is unrelated to the content of the dialog session of FIG. 2A, the natural language output 282A2 also includes a feedback prompt of "What did you think about the burrito from Café Lupe last night?". As described herein, the automated assistant 120 may provide the feedback prompt included in output 282A2 based on various criteria.

The user responds to the output 282A2 with positive natural language input 280B2. The automated assistant replies with natural language output 282B2 that includes confirmatory language "great" and a suggestion for another popular dish at Café Lupe. The automated assistant 120 may utilize the positive natural language input 280B2 to positively influence a value associated with the "burrito" content parameter. For example, the automated assistant 120 may adjust the value to increase the likelihood that "burrito" is recommended as a dish at Café Lupe and/or at other restaurants in future dialog sessions with the user and/or in future dialog sessions with other users.

FIG. 2B3 provides another example of providing a feedback prompt to the user based on the "burrito" content parameter stored in response to the dialog session of FIG. 2A. The dialog session of FIG. 2B3 may be one that occurs in lieu of, or in addition to, that of FIG. 2B1 and/or FIG. 2B2. In FIG. 2B3, the user provides natural language input 280A3 of "Play me some music" to initiate a dialog session between the user and the automated assistant 120. The dialog session of FIG. 2B2 is separate from that of FIG. 2A.

The automated assistant 120 responds to the natural language input 280A3 with responsive output 282A3 that includes a responsive song (indicated by the music notes). Even though the input 280A3 is unrelated to the content of the dialog session of FIG. 2A, the output 282A3 also includes a feedback prompt of "By the way, what did you think about the burrito from Café Lupe last night?". The feedback prompt may be provided after playing all or part of the responsive song. As described herein, the automated assistant 120 may provide the feedback prompt included in output 282A3 based on various criteria.

The user responds to the output 282A3 with positive natural language input 280B3. The automated assistant replies with output 282B3 that includes confirmatory language "good to hear" and then continues playing the responsive song or an additional song. The automated assistant 120 may utilize the positive natural language input 280B3 to positively influence a value associated with the "burrito" content parameter.

FIG. 2B4 provides another example of providing a feedback prompt to the user based on the "Café Lupe" content parameter stored in response to the dialog session of FIG. 2A. The dialog session of FIG. 2B4 may be one that occurs in lieu of, or in addition to, that of FIG. 2B1, FIG. 2B2, and/or FIG. 2B3.

FIG. 2B4 illustrates another client device 310 of the user 101 of FIG. 2A and a display screen 340 of the client device 310. The client device 310 may include and/or be in communication with the automated assistant 120 and/or another instance thereof (that has access to entries of the user 101 in content parameters database 154). The display screen 340 includes a reply interface element 388 that the user may select to generate user interface input via a virtual keyboard and a voice reply interface element 389 that the user may select to generate user interface input via a microphone. In some implementations, the user may generate user interface input via the microphone without selection of the voice reply interface element 389. For example, during the dialog session, active monitoring for audible user interface input via the microphone may occur to obviate the need for the user to select the voice reply interface element 389. In some of those and/or in other implementations, the voice reply interface element 389 may be omitted. Moreover, in some implementations, the reply interface element 388 may additionally and/or alternatively be omitted (e.g., the user may only provide audible user interface input). The display screen 340 also includes system interface elements 381, 382, 383 that may be interacted with by the user to cause the client device 310 to perform one or more actions.

In FIG. 2B4, the user provides natural language input 280A4 of "What's my day look like tomorrow" to initiate a dialog session between the user and the automated assistant 120. The dialog session of FIG. 2B2 is separate from that of FIG. 2A. In some implementations, the automated assistant 120 may determine it is a separate dialog session based on it occurring via a separate client device.

The automated assistant 120 responds to the natural language input 280A4 with responsive output 282A4 that includes summary of the user's calendar. Even though the input 280A4 and the output 282A4 are unrelated to the content of the dialog session of FIG. 2A, the automated assistant then provides a feedback prompt 282B4 of "By the way, did you like Café Lupe?". The user responds to the feedback prompt 282B4 with positive natural language input 280B4. In some implementations, the natural language input 280B4 may be free-form input. In some other implementations, the automated assistant 120 may present, in the dialog, multiple options for selection by the user. For instance, the automated assistant 120 may provide, in combination with the feedback prompt 282B4, an interface that includes multiple options such as "Yes", "No", and "it was OK"—and the user may select one of the options to provide corresponding responsive input.

FIGS. 2B1-2B4 provide examples of the user providing positive feedback and resultantly promoting corresponding content parameters. However, it is understood that the user may alternatively provide negative feedback that demotes corresponding content parameters.

Referring now to FIGS. 3A and 3B, additional examples of various implementations disclosed herein are described. FIG. 3A illustrates an example of a dialog session in which the automated assistant provides, to a user, content with a content parameter selected from a plurality of candidate content parameters. FIG. 3B illustrates an example of providing feedback prompts to the user in a separate dialog session, where the feedback prompts are based on the selected content parameters.

FIG. 3A illustrates the same client device 310 as that illustrated in FIG. 2B4. In FIG. 3A, there is a dialog session between the user ("You"), and additional user ("Tom"), and the automated assistant 120 ("Automated Assistant"). The user provides natural language input 380A1 of "Coffee in the morning?" that is directed to the additional user. The additional user provides responsive natural language input 381A1 of "Sure."

The user then invokes the automated assistant 120 into the dialog session by inclusion of "@AutomatedAssistant" in input 380A2 and request the automated assistant 120 to "Pick a good coffee shop". In response, the automated assistant 120 provides output 382A1 that includes a suggestion for "Hypothetical Roasters" that is highly reviewed and close to the user and the additional user. The output 382A1 may be provided for presentation to both the user (via client device 310) and the additional user (via a corresponding client device). The automated assistant 120 selects the location "Hypothetical Roasters" from a plurality of candidate options. Further, the automated assistant 120 can determine that the user acted upon the suggestion based on further signals associated with the user (e.g., the user issuing a navigation request to "Hypothetical Roasters", location data of the user indicating a visit to "Hypothetical Roasters", and/or other signals). Based on recommending the location, and optionally based on determining that the user acted upon the suggested location, the automated assistant 120 may store, in association with the user, content parameters that indicate the suggested location. For example, the automated assistant 120 may store, in the provided content parameters database 154 in association with the user, an indication of those selected and provided content parameters. The automated assistant 120 may additionally or alternatively store, in association with the additional user, content parameters that indicate the suggested location (optionally after determining that the additional user acted upon the suggested location).

FIG. 3B illustrates an example of providing, to the user 101 in a dialog session that is separate from that of FIG. 3A, feedback prompts that are based on the selected content parameter of FIG. 3A. In FIG. 3B, the user 101 provides natural language input 380B1, to the separate computing device 210, of "How's the commute home?". The dialog session of FIG. 3B is separate from that of FIG. 3A. For example, the dialog session of FIG. 3B may be determined to be a separate dialog session based on it occurring via the separate computing device 210.

The automated assistant 120 responds to the natural language input 380B1 with responsive natural language output 382B1 that includes a summary of the current traffic conditions. Even though the input 380B1 and the output 382B1 are unrelated to the content of the dialog session of FIG. 3A, the automated assistant 120 then provides feedback prompt 382B2 that solicits feedback on the "Hypothetical Roasters" content parameter. As described herein, the automated assistant 120 may provide the feedback prompt 382B2 based on various criteria such as the dialog session of FIG. 3B being separate from that of FIG. 3A, the input 380B1 and/or output 382B1 satisfying one or more criteria such as being considered "routine", and/or other criteria.

The user responds to the output 382B1 with negative natural language input 380B2. The automated assistant provides a further feedback prompt 382B3 soliciting feedback on whether there was anything particular that the user didn't like about "Hypothetical Roasters." The user responds to the output 382B3 with further natural language input 380B3 that specifies "Hypothetical Roasters" was too crowded. The automated assistant 120 may utilize the negative natural language input 380B2 to negatively influence a value associated with the "Café Lupe" content parameter. The automated assistant 120 may additionally or alternatively utilize the natural language input 380B3 to influence a value associated with a content parameter indicative of crowd level. For example, the automated assistant 120 may adjust a value to decrease the likelihood that restaurants associated with "heavy crowds" at one or more times will be recommended for those one or more times in future dialog sessions with the user and/or in future dialog sessions with other users.

FIG. 3B illustrates an example with the user 101 of the client device 310. However, a separate instance of the automated assistant 120 may additionally and/or alternatively provide feedback prompts to the additional user ("Tom") of FIG. 3A, via one of his client devices, based on the selected content parameter being stored in association with the additional user in the provided content parameters database 154.

Although examples provided in various Figures focus on location suggestions, techniques described herein may be implemented for other types of suggestions and/or other content. As one example, in response to user input of "play me some bluegrass", the automated assistant 120 may select a Bluegrass Album A to play in response. The automated assistant 120 may then provide a prompt in a future dialog session such as "How did you like Bluegrass Album A?". As another example, in response to user input of "current news", the automated assistant 120 may select current news from Source A to provide in response. The automated assistant 120 may then provide a prompt in a future dialog such as "Did you like Source A for the news or would you prefer another source?". As another example, in response to user input of "current news", the automated assistant 120 may select five news stories to provide in response. The automated assistant 120 may then provide a prompt in a future dialog session such as "Did you like the number of news stories provided earlier, or would you prefer more or fewer?". As yet another example, in response to user input of "navigate to a coffee shop", the automated assistant 120 may select the closest coffee shop and provide directions to that coffee shop. The automated assistant 120 may then provide a prompt in a dialog session the next day such as "I gave you directions to the closest coffee shop yesterday. In the future would you prefer a more highly rated coffee shop that is a bit farther away?".

FIG. 4 is a flowchart illustrating an example method 400 according to implementations disclosed herein. For convenience, the operations of the flow chart are described with reference to a system that performs the operations. This system may include various components of various computer systems, such as one or more components of automated assistant 120. Moreover, while operations of method 400 are shown in a particular order, this is not meant to be limiting. One or more operations may be reordered, omitted or added.

At block 452, the system receives natural language input that is based on user interface input provided by a user during a dialog session.

At block 454, the system generates content that is responsive to the natural language input and that includes at least one content parameter selected from a plurality of candidate content parameters.

At block 456, the system provides the content for presentation to the user as part of the dialog session and stores the selected content parameter of the content.

At block 458, the system identifies an additional dialog session that includes the user. In some implementations, block 458 may include block 460, in which the system generates and provides additional content for presentation to the user as part of the additional dialog session.

At block 462, the system provides, for presentation to the user as part of the additional dialog session, a prompt that solicits feedback on the stored selected content parameter.

At block 464, the system receives additional input that is responsive to the prompt and that is based on user interface input provided by the user during the additional dialog session.

At block 466, the system uses the additional input to influence a value stored in association with the selected content parameter.

Figure 5:
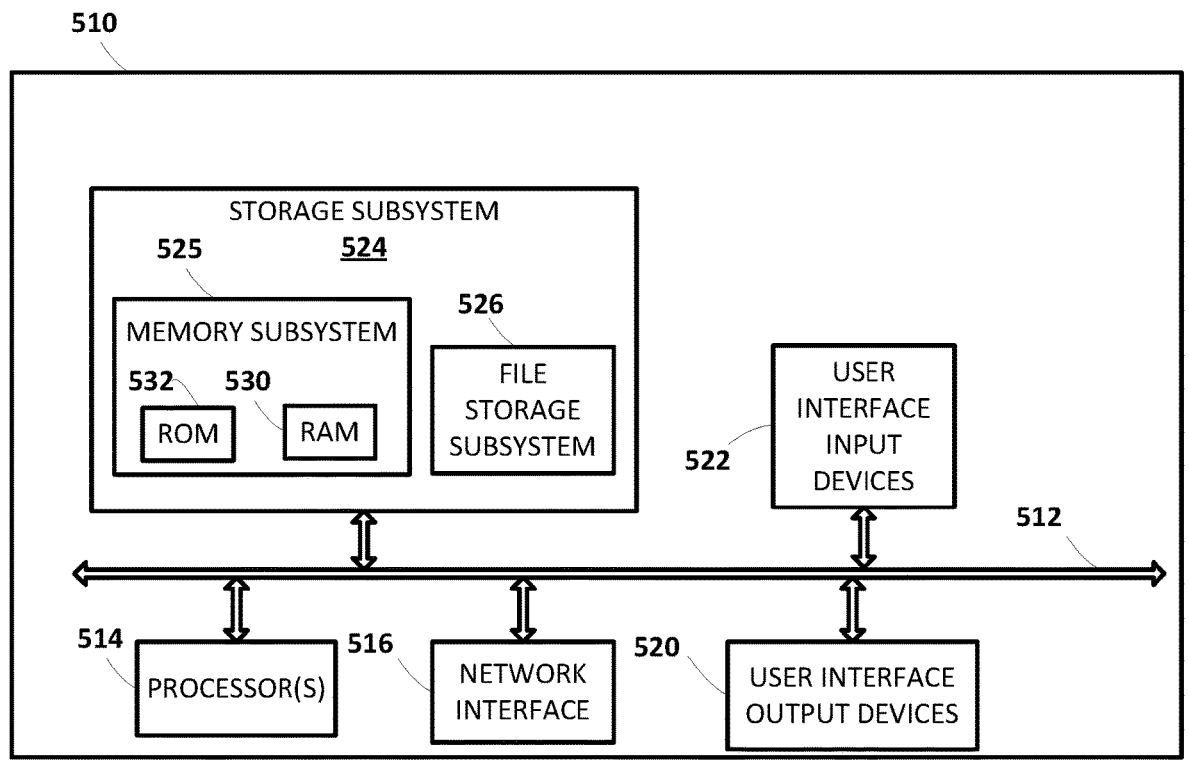
FIG. 5 illustrates an example architecture of a computing device.

FIG. 5 is a block diagram of an example computing device 510 that may optionally be utilized to perform one or more aspects of techniques described herein. In some implementations, one or more of a client computing device, automated assistant 120, and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the method of FIG. 4.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which certain implementations discussed herein may collect or use personal information about users (e.g., user data extracted from other electronic communications, information about a user's social network, a user's location, a user's time, a user's biometric information, and a user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:

receiving spoken input of a user during a prior dialog session between the user and an automated assistant;

processing the spoken input to select a certain suggestion from a plurality of candidate suggestions that are responsive to the spoken input;

causing the certain suggestion to be audibly and/or graphically presented to the user during the prior dialog session;

verifying that the user actually acted upon the suggestion after the suggestion was presented to the user;

determining that a current dialog session satisfies one or more criteria, the current dialog session being temporally separated from the prior dialog session and unrelated to the suggestion of the prior dialog session, and the current dialog session being via a client device and between the user and the automated assistant;

responsive to determining that the current dialog session satisfies the one or more criteria, and responsive to determining that the user actually acted upon the suggestion:

causing a prompt that solicits feedback on the suggestion to be presented to the user at an output component of the client device;

receiving user interface input that is responsive to the prompt;

using the user interface input to alter a value stored in association with the suggestion; and subsequent to altering the value, using the altered value in selecting a further suggestion to provide to the user in a further dialog session between the user and the automated assistant.

2. The method of claim 1, wherein the user interface input is a further spoken utterance and further comprising:

based on providing the prompt, causing at least one microphone of the client device to be preemptively opened.

3. The method of claim 1, wherein the user interface input is a further spoken utterance and further comprising:

based on providing the prompt, causing a local speech to text processor of the client device to be activated.

4. The method of claim 1, wherein the current dialog session includes voice-based input of the user, and wherein determining that the current dialog session satisfies the one or more criteria comprises:

determining that the voice-based input conforms to a voice profile of the user.

5. The method of claim 1, wherein the current dialog session includes voice-based input of the user, and wherein determining that the current dialog session satisfies the one or more criteria comprises:

determining that the voice-based input lacks certain background noise.

6. The method of claim 5, wherein the certain background noise indicates that other users may be present.

7. The method of claim 1, wherein determining that the current dialog session satisfies the one or more criteria comprises:

determining that content, provided during the current dialog session, includes personal content that is personal to the user.

8. The method of claim 1, wherein the prior dialog session is via an additional client device, wherein the current dialog session includes voice-based input of the user, and wherein determining that the current dialog session satisfies the one or more criteria comprises:

determining that the voice-based input conforms to a voice profile of the user.

9. The method of claim 1, wherein verifying that the user actually acted upon the suggestion after the suggestion was presented to the user is based on one or more signals that are not generated using the automated assistant.

10. The method of claim 1, wherein verifying that the user actually acted upon the suggestion after the suggestion was presented to the user is based on location data associated with the suggestion or a navigation request associated with the suggestion.

11. A client device, comprising:

at least one microphone;
at least one speaker;
a network interface;
one or more processors configured to:

as part of an additional dialog session between a user and an automated assistant that is temporally separated from a prior dialog session between the user and the automated assistant and that is initiated by the user with voice-based natural language input:

based on the voice-based natural language input conforming to a voice profile of the user:

provide, via the speaker, a prompt that solicits feedback on a suggestion previously provided for presentation to the user as part of the prior dialog session, wherein the prompt solicits feedback on the suggestion based on the suggestion being previously provided for presentation to the user as part of the prior dialog session, and based on determining that the user acted upon the suggestion; and based on providing the prompt, preemptively establish a communications session between the client device and a remote speech to text processor to process user interface input provided via the microphone.

12. The client device of claim 11, wherein the one or more processors are further configured to:

receive, via the microphone, an additional input that is responsive to the prompt; and provide, over the network interface, data based on the additional input, the data provided to influence a value that is stored in association with the suggestion and that influences future providing of further content that includes the suggestion.

13. The client device of claim 11, wherein the one or more processors are configured to provide the prompt further based on the voice-based natural language input lacking certain background noise that indicates other users may be present.

14. The client device of claim 11, wherein the one or more processors are further configured to render, based on providing the prompt, a graphical user interface that includes one or more selectable elements that are selectable to provide feedback.

15. A system comprising:

memory storing instructions;

one or more processors operable to execute the instructions to cause the one or more processors to:

receive spoken input of a user during a prior dialog session between the user and an automated assistant;

process the spoken input to select a certain suggestion from a plurality of candidate suggestions that are responsive to the spoken input;

cause the certain suggestion to be audibly and/or graphically presented to the user during the prior dialog session;

verify that the user actually acted upon the suggestion after the suggestion was presented to the user;

determine that a current dialog session satisfies one or more criteria, the current dialog session being temporally separated from the prior dialog session and unrelated to the suggestion of the prior dialog session, and the current dialog session being via a client device and between the user and the automated assistant;

responsive to determining that the current dialog session satisfies the one or more criteria, and responsive to determining that the user actually acted upon the suggestion:

cause a prompt that solicits feedback on the suggestion to be presented to the user at an output component of the client device;

receive user interface input that is responsive to the prompt;

use the user interface input to alter a value stored in association with the suggestion; and subsequent to altering the value:

select a further suggestion, in a further dialog session between the user and the automated assistant, wherein in selecting the further suggestion one or more of the processors are to select the further suggestion based on the altered value; and cause the further suggestion to be presented to the user at the client device or an additional client device of the user.

16. The system of claim 15, wherein the user interface input is a further spoken utterance and wherein in executing the instructions one or more of the processors are to:

based on providing the prompt, cause at least one microphone of the client device to be preemptively opened.

17. The system of claim 15, wherein the current dialog session includes voice-based input of the user, and wherein in determining that the current dialog session satisfies the one or more criteria one or more of the processors are to:

determine that the voice-based input conforms to a voice profile of the user.

18. The system of claim 15, wherein in determining that the current dialog session satisfies the one or more criteria one or more of the processors are to:

determine that content, provided during the current dialog session, includes personal content that is personal to the user.

\* \* \* \* \*